US012483176B2

(12) United States Patent
Kutcherlapati et al.

(10) Patent No.: US 12,483,176 B2
(45) Date of Patent: Nov. 25, 2025

(54) SYSTEMS AND METHODS FOR SELECTIVELY ENABLING POWER FACTOR CONTROL IN AN ELECTRIC MOTOR

(71) Applicant: Regal Beloit America, Inc., Milwaukee, WI (US)

(72) Inventors: Srinivas Chandu Kutcherlapati, Tipp City, OH (US); Howard Richardson, Troy, OH (US); Justin Magyar, Troy, OH (US)

(73) Assignee: Regal Beloit America, Inc., Milwaukee, WI (US)

( * ) Notice: Subject to any disclaimer, the term of this patent is extended or adjusted under 35 U.S.C. 154(b) by 188 days.

(21) Appl. No.: 18/523,752

(22) Filed: Nov. 29, 2023

(65) Prior Publication Data

US 2024/0178782 A1    May 30, 2024

Related U.S. Application Data

(60) Provisional application No. 63/385,313, filed on Nov. 29, 2022.

(51) Int. Cl.
*H02M 1/42* (2007.01)
*H02P 27/06* (2006.01)

(52) U.S. Cl.
CPC .......... *H02P 27/06* (2013.01); *H02M 1/4208* (2013.01)

(58) Field of Classification Search
CPC ...... H02P 27/06; H02P 23/26; H02M 1/4208; H02M 1/0032; H02M 1/0048; H02M 5/458
See application file for complete search history.

(56) References Cited

U.S. PATENT DOCUMENTS

| | | | |
|---|---|---|---|
| 7,420,351 B2 | 9/2008 | Grbovic | |
| 7,683,568 B2 | 3/2010 | Pande et al. | |
| 9,923,506 B1 | 3/2018 | Kochan, Jr et al. | |
| 10,236,805 B2 | 3/2019 | Becerra et al. | |
| 10,411,619 B2 | 9/2019 | Li et al. | |
| 10,483,898 B1 | 11/2019 | Stauffer et al. | |
| 2021/0226527 A1* | 7/2021 | Pasqua | H02M 1/4225 |

* cited by examiner

*Primary Examiner* — Muhammad S Islam
(74) *Attorney, Agent, or Firm* — Armstrong Teasdale LLP

(57) ABSTRACT

An electric motor is provided. The electric motor includes a motor controller configured to convert AC power to a variable frequency variable voltage power for driving the electric motor according to a commanded motor output. The motor controller includes a PFC circuit configured to control a power factor of the electric motor and a microcontroller coupled to the PFC circuit and configured to activate the PFC circuit when the commanded motor output is greater than a threshold motor output, deactivate the PFC circuit when the commanded motor output is less than or equal to the threshold motor output, and generate a control signal based on the commanded motor output. The motor controller further includes an inverter configured to receive the control signal and generate the variable frequency variable voltage power according to the commanded motor output.

20 Claims, 4 Drawing Sheets

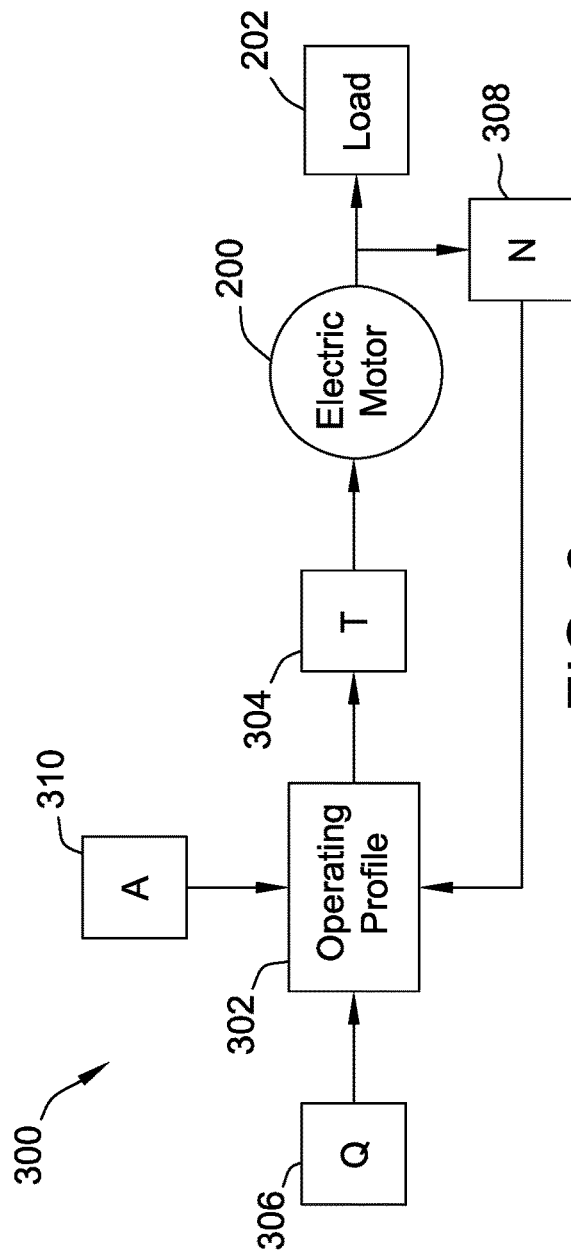
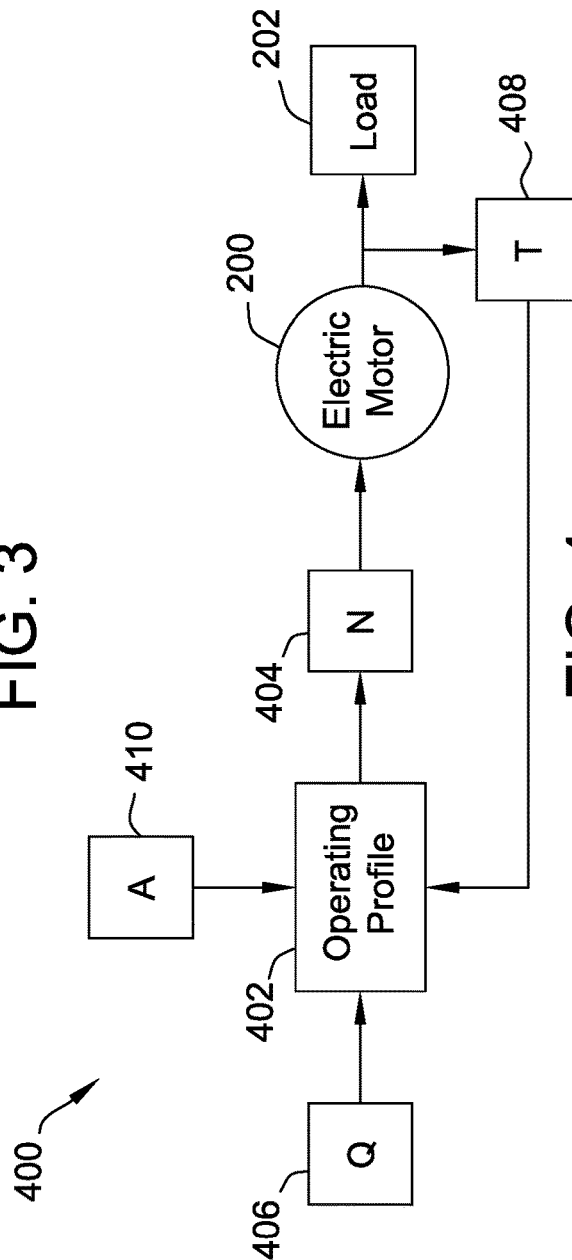

SYSTEMS AND METHODS FOR SELECTIVELY ENABLING POWER FACTOR CONTROL IN AN ELECTRIC MOTOR

CROSS-REFERENCE TO RELATED APPLICATIONS

This application claims the benefit of priority of U.S. Provisional Patent Application No. 63/385,313, filed Nov. 29, 2022, and entitled "SYSTEMS AND METHODS FOR SELECTIVELY ENABLING POWER FACTOR CONTROL IN AN ELECTRIC MOTOR," the contents and disclosures of which are hereby incorporated by reference in their entirety.

FIELD

The field of the disclosure relates generally to control of electric motors and, more specifically, selectively enabling power factor control in an electric motor to improve energy efficiency.

BACKGROUND

Electric motors utilize electric power to drive a mechanical load, such as, for example, a pool or spa pump, a fan or blower, or a propulsion system, among other applications. Power factor is a measure of how efficiently electric power in an alternating current (AC) power system is transferred to a load (or the reverse when the load is generating power). Power factor for an electric motor is a ratio of real power delivered to the load to the apparent power consumed by the electric motor, and ranges from −1 to 1, where a power factor of 1 indicates a perfectly efficient transfer of real power to the load, real power representing the work performing power. A power factor below 1 indicates the voltage and current supplied to the electric motor are out of phase, which reduces the real power available to the load. In other words, for a given amount of work to be performed by the load, an increasing amount of apparent power (i.e., more current) must be delivered to the electric motor as power factor declines.

Some electrical systems include power factor correction (PFC) features that improve the power factor for the equipment in which they are installed. Some electric motors include active or passive power factor correction. However, inclusion of PFC circuitry may reduce the energy efficiency of the equipment, particularly at lower load points at which the efficiency advantages of PFC are reduced and potentially outweighed by the energy consumption of the PFC circuitry itself.

BRIEF DESCRIPTION

In one aspect, an electric motor for a pump is provided. The electric motor includes a motor controller configured to convert AC power to a variable frequency variable voltage power for driving the electric motor according to a commanded motor output. The motor controller includes a PFC circuit configured to control a power factor of the electric motor and a microcontroller coupled to the PFC circuit and configured to activate the PFC circuit when the commanded motor output is greater than a threshold motor output, deactivate the PFC circuit when the commanded motor output is less than or equal to the threshold motor output, and generate a control signal based on the commanded motor output. The motor controller further includes an inverter configured to receive the control signal and generate the variable frequency variable voltage power according to the commanded motor output.

In another aspect, a method for controlling an electric motor for a pump is provided. The method includes activating a PFC circuit when a commanded motor output is greater than a threshold motor output. The PFC circuit is configured to control a power factor of the electric motor. The method further includes deactivating the PFC circuit when the commanded motor output is less than or equal to the threshold motor output, generating a control signal based on the commanded motor output, and controlling an inverter using the control signal to generate a variable frequency variable voltage power for driving the electric motor according to the commanded motor output.

In another aspect, a motor controller for driving an electric motor according to a commanded motor output is provided. The motor controller includes a PFC circuit configured to control a power factor of said electric motor and a microcontroller coupled to said PFC circuit and configured to activate the PFC circuit when the commanded motor output is greater than a threshold motor output, deactivate the PFC circuit when the commanded motor output is less than or equal to the threshold motor output, and generate a control signal based on the commanded motor output. The motor controller further includes an inverter configured to receive the control signal and generate a variable frequency variable voltage power according to the commanded motor output.

BRIEF DESCRIPTION OF THE DRAWINGS

FIG. 3 is a schematic diagram of an example control loop for a torque-controlled electric motor;

FIG. 4 is a schematic diagram of an example control loop for a speed-controlled electric motor.

DETAILED DESCRIPTION

The disclosed systems and methods provide selective PFC in an electric motor such as a pump motor. The electric motor includes a motor controller for driving the electric motor according to a commanded motor output (e.g., a commanded speed or torque). The motor controller includes a power factor correction circuit configured to control (e.g., increase) a power factor of the electric motor when active. The motor controller further includes a microcontroller coupled in communication with the PFC circuit and configured to activate or deactivate the PFC circuit in response to parameters such as the commanded motor output.

For example, when the commanded motor output is relatively high (e.g., above a threshold commanded motor output), a current draw of the electric motor may be undesirably high, so the microcontroller is configured to activate the PFC circuit to increase the power factor of the electric motor and reduce the current draw. When the commanded motor output is relatively low (e.g., below the threshold commanded motor output, and PFC is not necessary for producing the commanded motor output without drawing excessive current, the microcontroller is configured to deactivate the PFC circuit, which generally reduces power consumption of the electric motor. While disabling PFC at a low output may result in a potentially lower power factor and less efficiency at that specific operating point, on the whole, such an efficiency drop may be acceptable because of the power savings from removing the operating losses of the PFC circuit. Accordingly, by selectively activating and deactivating the PFC circuit, the energy efficiency of the electric motor may be improved while meeting load and safety requirements.

Figure 1:
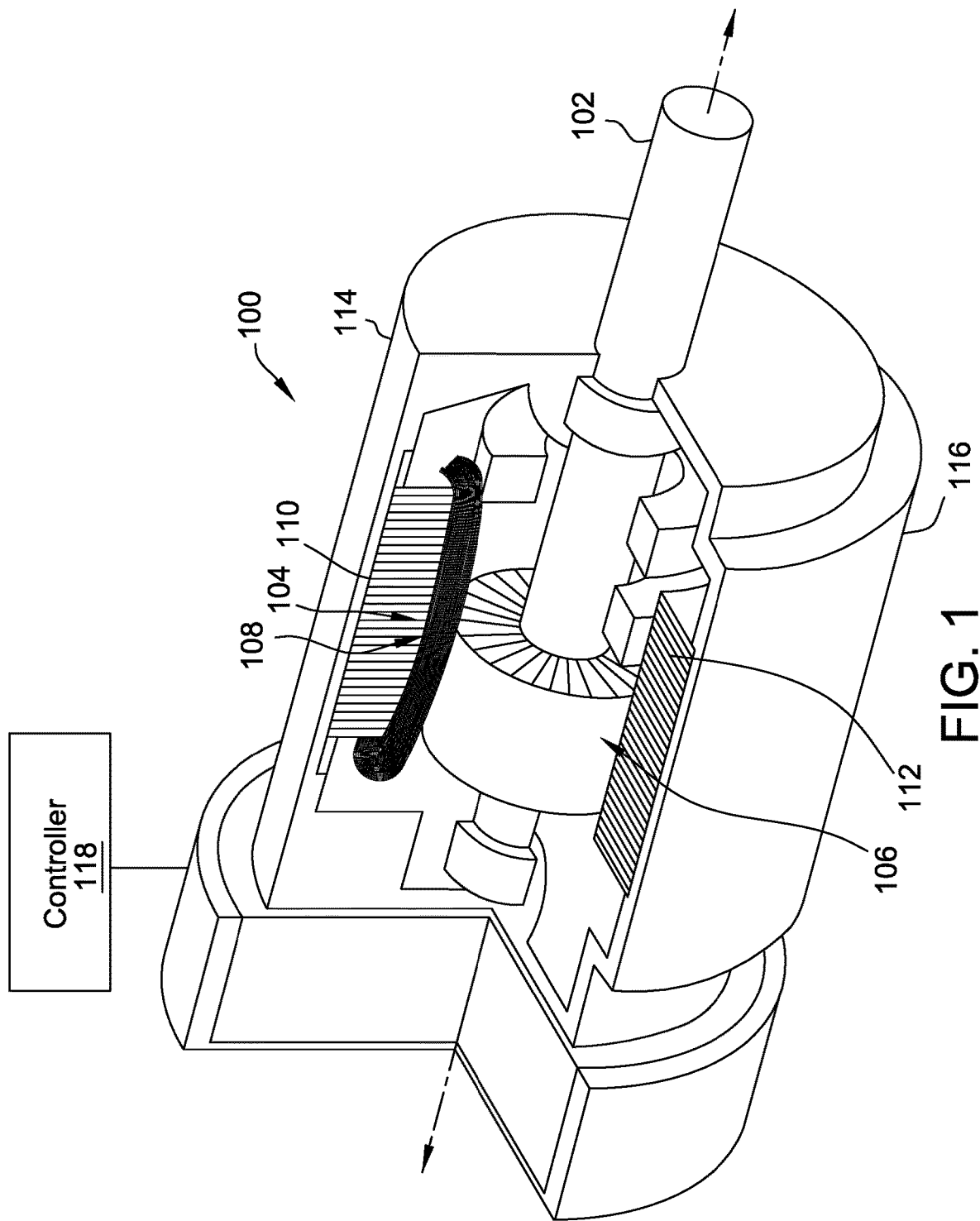
FIG. 1 is a partial cross-sectional view of an exemplary electric machine, such as an electric motor.

FIG. 1 is a partial cross-sectional view of an exemplary electric machine 100. The electric machine 100 may be an electric motor or an electric generator. The electric motor may be used to power any mechanism, or load, for example, a pump, a cyclic drive, a compressor, a vehicle or other propulsion system, a fan, or a blower.

The electric machine 100 typically includes a centrally located motor shaft 102 that rotates relative to electric machine 100. Electrical energy, i.e., a voltage, is applied to coils 104 within electric machine 100. Coils 104 conduct an electric current to generate an electromagnetic field that cooperates with an electromagnetic field in rotor 106 mounted to the motor shaft 102. Coils 104 initiate relative motion between shaft 102 and electric machine 100 to transfer the power from coils 104 to shaft 102.

A stationary assembly 108, also referred to as a stator, includes stator core 110 and coils 104, or windings, positioned around portions of stator core 110. Energy is applied to coils 104 to initiate the relative motion that transfers the power to shaft 102. Coils 104 are formed by winding wire (not shown), typically copper, aluminum, or a combination thereof, about a central core to form the winding or coil. An electric current is directed through coils 104 that induces a magnetic field. The magnetic field induces the relative motion to transfer the power to shaft 102. The stator core 110 typically includes a solid core or a plurality of stator core laminations 112 that define stator teeth (not shown) around which coils 104 are wound.

Electric machine 100 generally includes a housing 114 having an inner wall or surface that defines a motor cavity therein. The housing 114 may include a plurality of components and may be made of a suitable durable material, for example a metal, a polymer, or a composite. The housing 114 may, as shown, include a cylindrical shell 116 and opposed end caps (not shown).

Housing 114 of the motor may have any suitable shape. One common shape of a motor housing is that of a cylindrical solid, having a generally cylindrical cross section. The shaft on a motor with such a shape generally extends from an end of the motor.

The electric machine 100 may have any suitable size and shape, and may be, for example, an induction motor, a permanent-split capacitor (PSC) motor, an electronically commutated motor (ECM) motor, or a switched reluctance motor. The electric machine 100 may, as shown, be a radial flux motor or may be an axial flux motor. The housing 114 may include protrusions, for example fins (not shown), for dissipation of heat. The electric machine 100 may also include a fan (not shown) positioned within housing 114. The electric machine 100 may be electronically controlled, particularly if the motor is an ECM motor, by, for example, a motor controller 118. The motor controller 118 may be internally or externally mounted to the electric machine 100. Alternatively, the motor controller 118 may be spaced from the electric machine 100 and may, for example, be a part of a system controller (not shown).

Figure 2:
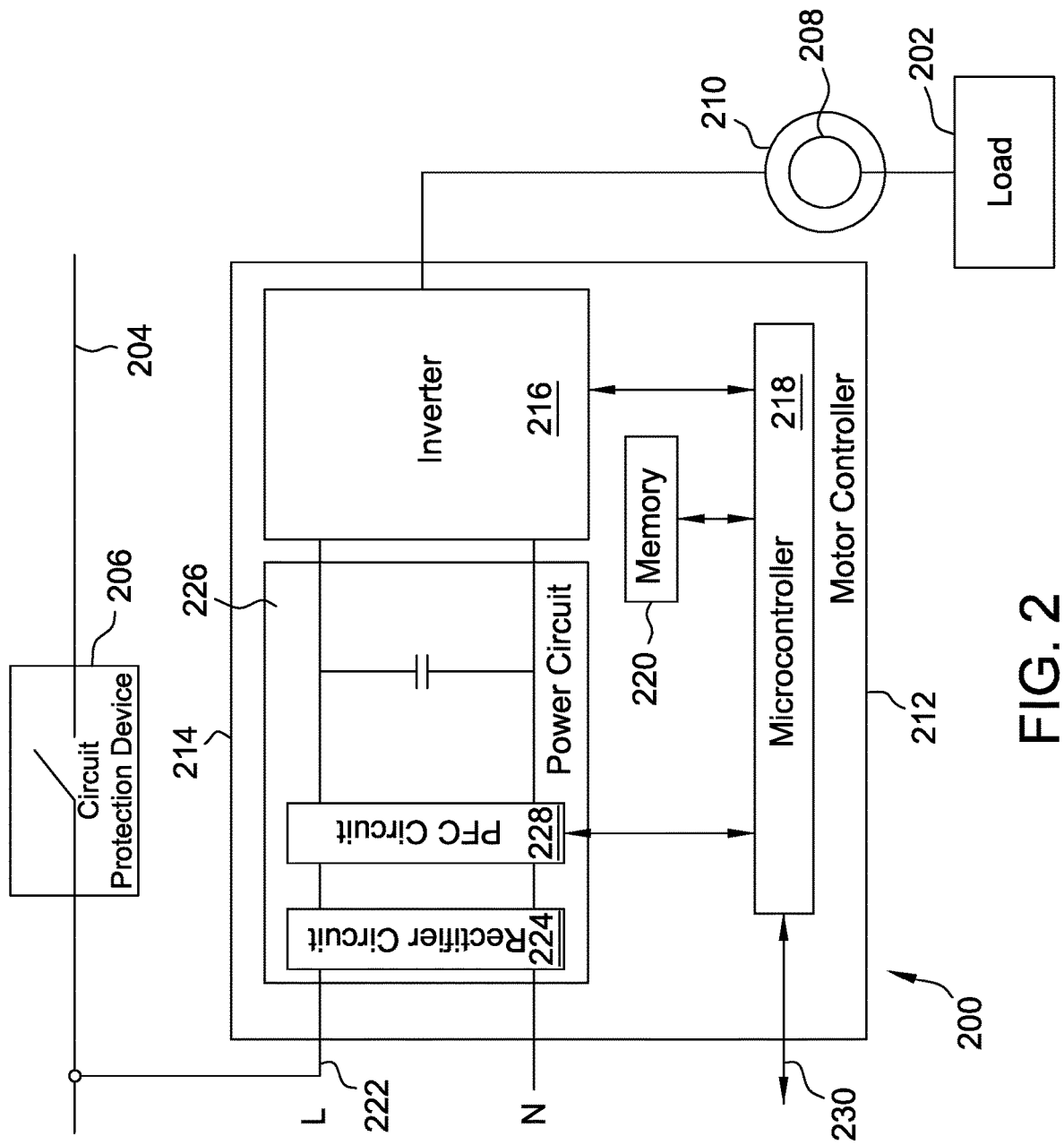
FIG. 2 is a diagram of an electric motor for driving a load, such as a pump.

FIG. 2 is a diagram of an electric motor 200 for driving a load 202, such as a pump commonly used, for example, in pools and spas. As such, electric motor 200 is typically connected to line frequency alternating current (AC) power, which is typically 50 Hertz or 60 Hertz and can be supplied at various line voltages, including, for example, 100 Volt, 110 Volt, 200 Volt, or 220 Volt among others. Line frequency AC power is generally supplied as one or more phases on one or more corresponding circuits 204. Each circuit 204 supplying line frequency AC power is typically protected by one or more circuit protection devices 206. Circuit protection device 206 may include a circuit breaker, fuse, switch gear, or other suitable device for limiting current conducted through circuit 204. For example, a typical outdoor residential circuit is protected by one or more 20 ampere circuit breaker.

Electric motor 200 includes a rotor assembly 208 that rotates relative to a stator assembly 210, and is mechanically coupled to load 202, such as a pump. Electric motor 200 includes a motor controller 212 that regulates power to, or operates, rotor assembly 208 and stator assembly 210 to drive load 202. Motor controller 212 includes a power circuit 214, an inverter 216, or "drive," a microcontroller 218 or other processor, and memory 220.

Power circuit 214 receives line-frequency AC power at an AC line-in node 222 for powering the various components of electric motor 200. Power circuit 214 includes a rectifier circuit 224 that rectifies, or converts, line frequency AC power to a direct current (DC) voltage. The DC voltage is supplied to a DC bus 226 that delivers DC voltage to inverter 216 and other components, such as microcontroller 218 and memory 220. Power circuit 214 further includes a PFC circuit 228 that, when enabled, increases a power factor of electric motor 200 using, for example, one or more switches and reactivity compensating components such as capacitors and/or inductors. In some embodiments, PFC circuit 228 is an active PFC circuit such as an active PFC chip. While rectifier circuit 224 and PFC circuit 228 are shown separately in FIG. 2, in certain embodiments, rectifier circuit 224 is at least partially incorporated into PFC circuit 228, such that at least some components of PFC circuit 228 perform rectifying functions. PFC circuit 228 is coupled in communication with microcontroller 218 and is configured to activate and deactivate in response to an enable signal received from microcontroller 218.

Inverter 216 includes an array of semiconductor switches controlled to switch the DC voltage supplied by DC bus 226 in a manner to produce one or more phases of a variable frequency variable voltage current for supplying to windings of stator assembly 210. Inverter 216 is controlled by microcontroller 218.

Microcontroller 218 is configured to communicate with memory 220 and inverter 216. Microcontroller 218 provides control signals to inverter 216, and inverter 216, in response, supplies current to windings of stator assembly 210 in the form of a variable frequency variable voltage signal. Accordingly, microcontroller 218 commands a motor output, i.e., a speed or torque output, at which electric motor 200 operates. In some embodiments, microcontroller 218 is configured to communicate with a user device, for example, through a wired or wireless communication channel, such as a serial interface or a Wi-Fi or Bluetooth connection. In such embodiments, users may view status data and control electric motor 200 via, for example, a mobile or web application. Similarly, microcontroller 218 may be configured to communicate with a system controller or other remote device through a wired or wireless communication channel. Such communication may include transmission of a system control signal from, e.g., the system controller, to microcontroller 218, including a commanded motor output (Q), such as a commanded speed or a commanded torque. Alternatively, the system control signal may include an operating mode, e.g., high or low, from which microcontroller 218 can determine an appropriate commanded motor output (Q), which may be stored in memory 220 as a discreet value, as a table of values, or as algorithm or formula, each of which representing an operating profile for electric motor 200.

Microcontroller 218 executes a control loop to determine a set point for motor output, i.e., speed or torque output, for electric motor 200. The control loop generally operates in a closed loop based on a commanded motor output (Q) and a measured parameter feedback, the feedback typically including either measured speed (N) output or measured torque (T) output from electric motor 200. Microcontroller 218 executes the control loop iteratively to converge motor output toward the set point for motor output, e.g., using a PI or PID control logic. Microcontroller 218 may additionally use an operating profile to translate the commanded motor output (Q) to the set point. The operating profile may include a table of values, i.e., a lookup table, discreet values, or an algorithm or formula stored in memory 220. In certain embodiments, for example, those using an algorithm or formula, the operating profile may use one or more coefficients or constants (A) determined at manufacture, at calibration, or at installation, and written to memory 220.

FIG. 3 is a schematic diagram of one embodiment of a control loop 300 for use in controlling a torque-controlled electric motor, such as electric motor 200. Control loop 300 may be embodied, for example, in motor controller 212, microcontroller 218, or another processor in a system controller (not shown) or other remote device, and illustrates control of electric motor 200 by execution of an operating profile 302 to compute a torque set point 304. Operating profile 302 uses a commanded motor output (Q) 306 and measured speed (N) 308, and computes torque set point 304. Operating profile 302 includes at least a control logic, such as a PI or PID algorithm, for computing torque set point 304, and the algorithm may use a set of coefficients or constants (A) 310. Constants 310 may be programmed into operating profile 302 and written to memory 220, or may be stored in memory 220 independent of operating profile 302 and accessed when control loop 300 is executed. Operating profile 302 may also include a table of values, or look up table, or an algorithm or formula for translating commanded motor output 306 to torque set point 304.

FIG. 4 is a schematic diagram of one embodiment of a control loop 400 for use in controlling a speed-controlled electric motor, such as electric motor 200. Control loop 400 may be embodied, for example, in motor controller 212, microcontroller 218, or another processor in a system controller (not shown) or other remote device, and illustrates control of electric motor 200 by execution of an operating profile 402 to compute a speed set point 404. Operating profile 402 receives a commanded motor output (Q) 406 and measured torque (T) 408, and computes speed set point (N) 404. Operating profile 402 includes at least a control logic, such as a PI or PID algorithm, for computing speed set point 404, and the algorithm may use a set of coefficients or constants (A) 410. Constants 410 may be programmed into operating profile 402 and written to memory 220, or may be stored in memory 220 independent of operating profile 402 and accessed when control loop 400 is executed. Operating profile 402 may also include a table of values, or look up table, or an algorithm or formula for translating commanded motor output 406 to speed set point 404.

Referring again to FIG. 2, microcontroller 218 is configured to activate PFC circuit 228 when the commanded motor output (Q) is greater than a threshold motor output, and to deactivate PFC circuit 228 when the commanded motor output (Q) is less than the threshold motor output. When microcontroller 218 receives a commanded motor output, such as a commanded speed and/or a commanded torque, microcontroller 218 is configured to compare the commanded motor output to the threshold motor output (e.g., a threshold speed and/or a threshold torque). Generally, deactivating and/or leaving inactive PFC circuit 228 reduces an overall power consumption of electric motor 200, enabling electric motor 200 to achieve a higher overall energy efficiency. At higher loads (e.g., higher speed and/or torque demands), an increased current draw at AC line-in node 222 may result in an over-current condition that could trigger circuit protection device 206, e.g., trip a circuit breaker. Accordingly, PFC may be necessary for electric motor 200 to meet the demanded load without causing an over-current condition. Accordingly, the threshold motor output is selected to achieve higher energy efficiency at lower loads when PFC is not necessary to meet the load demand without excessive current, while enabling electric motor 200 to meet higher loads by activating PFC circuit 228 when necessary to meet the higher loads. For this reason, the threshold motor output may depend on characteristics of electric motor 200. For example, in some embodiments, electric motor is configured to operate at about 230 volts AC, and the threshold is in a range of about 2775 rotations per minute (RPM) to about 3000 RPM, and in some embodiments, electric motor 200 is configured to operate ab about 115 volts AC, and the threshold is in a range of about 1175 RPM to about 2000 RPM. In some alternative embodiments, PCF circuit 228 is activated when the commanded motor output (Q) is less than a threshold motor output, or falls within or not within a predefined motor output range.

In some embodiments, microcontroller 218 is configured to activate and/or deactivate PFC circuit 228 in response to other parameters such as, for example, output or input current, fluid flow (e.g. through the pump), temperature, time, or other parameters detectable or determinable by microcontroller 218. For example, in some such embodiments, microcontroller 218 is configured to receive measurements of current from a current sensing device such as a current transformer, a hall effect sensor, or other suitable current sensing device or circuit positioned to detect, for example, an output current or an input current of electric motor 200. If the measured current exceeds a current threshold or other relevant parameter threshold, microcontroller 218 is configured to activate PFC circuit 228, which may increase a power factor and reduce a current draw of electric motor 200. In certain such embodiments, when activated in response to current exceeding the current threshold, microcontroller 218 is configured to continue enabling PFC circuit 228, for example, for a preset period of time, until a load or commanded motor output (Q) is reduced to a certain threshold, or until the measured current is reduced by a predetermined threshold. In some embodiments, microcontroller 218 may be coupled to a fluid flow sensor configured to detect a fluid flow, for example, through the pump, and microcontroller 218 may activate or deactivate PFC circuit based on the fluid flow (e.g., whether the fluid flow exceeds a fluid flow threshold).

Figure 5:
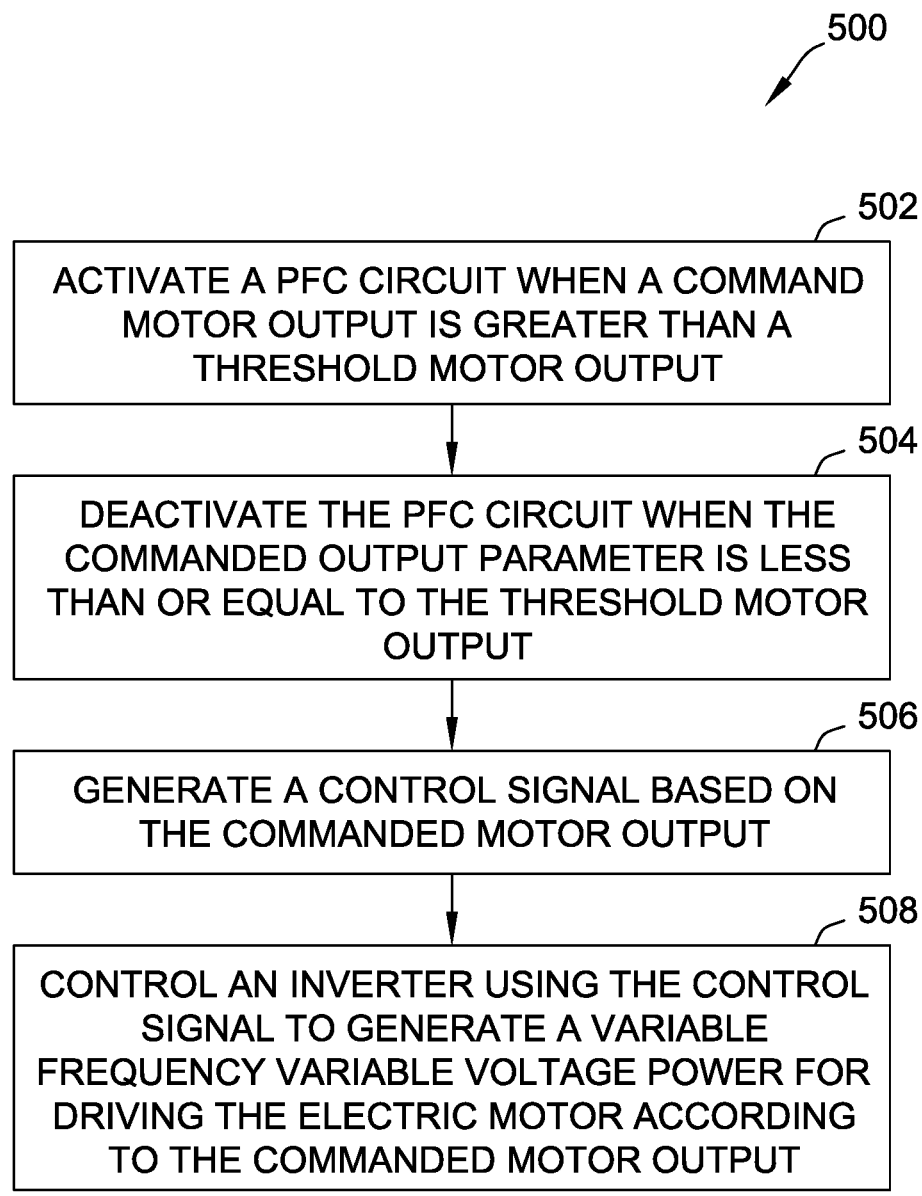
FIG. 5 is a flow diagram of an example method of controlling an electric motor.

FIG. 5 is a flow diagram of an exemplary method 500 of controlling electric motor 200. Method 500 may be embodied in a motor controller, such as motor controller 212 including inverter 216, microcontroller 218, and PFC circuit 228 (all shown in FIG. 2).

Microcontroller 218 activates 502 PFC circuit 228 when the commanded motor output (Q) is greater than a threshold motor output. Microcontroller 218 deactivates 504 PFC circuit 228 when the commanded motor output (Q) is less than or equal to the threshold motor output. Microcontroller 218 generates 506 a control signal based on the commanded motor output (Q). Microcontroller 218 controls 508 inverter 216 using the control signal to generate a variable frequency variable voltage power for driving electric motor 200 according to the commanded motor output (Q).

The methods and systems described herein may be implemented using computer programming or engineering techniques including computer software, firmware, hardware or any combination or subset thereof, wherein the technical effect may include at least one of: (a) improving an energy efficiency of an electric motor by deactivating PFC circuitry when load demands are less than a threshold; and (b) improving power factor of an electric motor to reduce current draw by enabling PFC circuitry when load demands exceed a threshold.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, compact disc-read only memory (CD-ROM), digital versatile discs (DVDs), and any other digital source such as a network or the Internet, as well as yet to be developed digital means, with the sole exception being a transitory, propagating signal. Alternatively, a floppy disk, a CD-ROM, a magneto-optical disk (MOD), a DVD, or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric motor for a pump, the electric motor comprising:
   a motor controller configured to convert alternating current (AC) power to a variable frequency variable voltage power for driving said electric motor according to a commanded motor output, said motor controller comprising:
      a power factor correction (PFC) circuit configured to control a power factor of said electric motor;
      a microcontroller coupled to said PFC circuit and configured to:
         activate said PFC circuit when the commanded motor output is greater than a threshold motor output;
         deactivate said PFC circuit when the commanded motor output is less than or equal to the threshold motor output; and
         generate a control signal based on the commanded motor output; and
      an inverter configured to receive the control signal and generate the variable frequency variable voltage power according to the commanded motor output.

2. The electric motor of claim 1, wherein the commanded motor output includes a commanded speed, and wherein the threshold motor output is a threshold speed.

3. The electric motor of claim 2, wherein the threshold speed is within a range of 600 rotations per minute (RPM) to 3600 RPM.

4. The electric motor of claim 1, wherein the commanded motor output includes a commanded torque, and wherein the threshold motor output is a threshold torque.

5. The electric motor of claim 1, wherein said microcontroller is further configured to:
   receive a measurement of a parameter;
   compare the measurement of the parameter to a parameter threshold; and
   activate said PFC circuit in response to the measurement of the parameter exceeding the parameter threshold.

6. The electric motor of claim 5, wherein the parameter is a current and the parameter threshold is a current threshold.

7. The electric motor of claim 5, wherein the parameter is a fluid flow and the parameter threshold is a fluid flow threshold.

8. The electric motor of claim 1, wherein said microcontroller is configured to receive the commanded motor output from a remote device.

9. The electric motor of claim 1, wherein deactivating said PFC circuit reduces a power consumption of said electric motor.

10. A method for controlling an electric motor for a pump, said method comprising:
    activating a power factor correction (PFC) circuit when a commanded motor output is greater than a threshold motor output, the PFC circuit configured to control a power factor of the electric motor;
    deactivating the PFC circuit when the commanded motor output is less than or equal to the threshold motor output;
    generating a control signal based on the commanded motor output; and
    controlling an inverter using the control signal to generate a variable frequency variable voltage power for driving the electric motor according to the commanded motor output.

11. The method of claim 10, wherein the commanded motor output includes a commanded speed, and wherein the threshold motor output is a threshold speed.

12. The method of claim 10, wherein the commanded motor output includes a commanded torque, and wherein the threshold motor output is a threshold torque.

13. The method of claim 10, further comprising:
    receiving a measurement of a parameter;
    comparing the measurement of the parameter to a parameter threshold; and
    activating the PFC circuit in response to the measurement of the parameter exceeding the parameter threshold.

14. The method of claim 13, wherein the parameter is a current and the parameter threshold is a current threshold.

15. The method of claim 13, wherein the parameter is a fluid flow and the parameter threshold is a fluid flow threshold.

16. The method of claim 10, further comprising receiving the commanded motor output from a remote device.

17. The method of claim 10, further comprising reducing a power consumption of said electric motor by deactivating the PFC circuit.

18. A motor controller for driving an electric motor according to a commanded motor output, said motor controller comprising:
    a power factor correction (PFC) circuit configured to control a power factor of said electric motor; and
    a microcontroller coupled to said PFC circuit and configured to:
       activate said PFC circuit when the commanded motor output is greater than a threshold motor output; and
       deactivate said PFC circuit when the commanded motor output is less than or equal to the threshold motor output; and
       generate a control signal based on the commanded motor output; and
    an inverter configured to receive the control signal and generate a variable frequency variable voltage power according to the commanded motor output.

19. The motor controller of claim 16, wherein the commanded motor output includes a commanded speed, and wherein the threshold motor output is a threshold speed.

20. The motor controller of claim 16, wherein the commanded motor output includes a commanded torque, and wherein the threshold motor output is a threshold torque.

* * * * *